Figure 1:
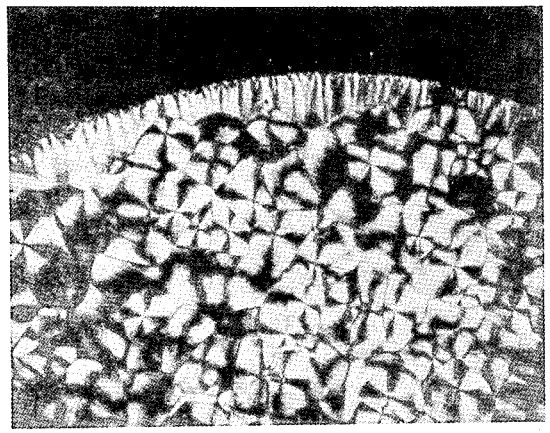

(120 x)

(120 x)

(120 x)

*Fig.4* (50X)
*Fig.5* (50X)
*Fig.6* (350X)
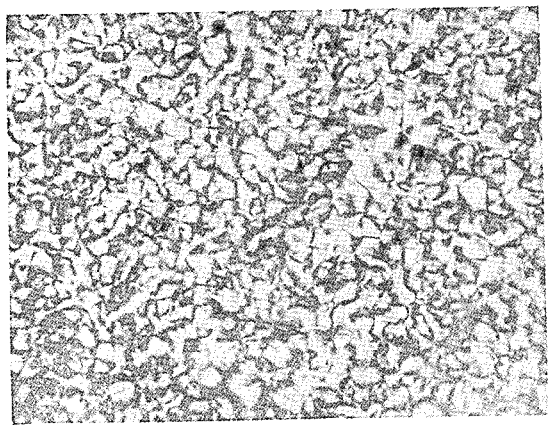

ing only by 5° C.
United States Patent Office 2,976,572
Patented Mar. 28, 1961

2,976,572

METHOD FOR PREPARING A MOLDING MATERIAL FROM HIGH MOLECULAR WEIGHT SUBSTANCES AND THE RESULTING PRODUCTS

Jacob Christoffel Ferdinand Kessler, Velp, Arnhem, Netherlands, assignor to N.V. Onderzoekingsinstituut Research, Arnhem, Netherlands, a corporation of the Netherlands Filed May 17, 1957, Ser. No. 659,987

Claims priority, application Netherlands May 22, 1956

9 Claims. (Cl. 18—47.5)

This invention relates to a new and improved method for preparing finely divided molding materials from high molecular weight substances such as of the polycondensation type including synthetic linear polyamides and polyesters. The invention also relates to the new and improved molding materials made in accordance with the process of the invention.

Methods for the preparation of finely divided molding materials on the basis of crystallizable linear polycondensation and polymerization products, such as synthetic linear polyamides and polyesters of high molecular weight, are generally known. If these molding materials are formed in the usual way in molten condition and are thereafter cooled, products consisting of both crystalline and amorphous portions are obtained. Depending on whether a lower or higher rate of cooling is employed, a crystalline (spherulitic) or an amorphous structure predominates in the product.

Molded products having a preponderantly spherulitic structure are characterized by a greater strength, hardness and rigidity whereas on the other hand molded products having an amorphous structure are more ductile and flexible. Molded products consisting of portions of different structure consequently do not have the same mechanical and physical properties throughout.

A method for the manufacture of molded objects out of molding materials on the basis of crystallizable linear polymerization and polycondensation products, such as polyamides, polyesters and polyethylenes, in which the formation of spherulites is suppressed is already known. This is accomplished by homogeneously heating the molded material before or during its shaping above its melting temperature but below its critical temperature. After having been cooled the molded object shows a homogeneous finely grained structure which is known by the name of disturbed spherulite structure. As a result of this structure these molded products have the same mechanical and physical properties throughout.

A disadvantage of this method, however, is that in practice it is difficult to effect the homogeneous heating between the melting temperature and the critical temperature, these temperatures in the case of polyamides generally differing only by 5° C.

It is not possible to effect this homogeneous heating with extrusion apparatus presently available on the market unless considerable changes are made in the apparatus. Moreover, when using injection molding machines it is neither possible to carry out the required homogeneous heating nor can these machines be rebuilt for that purpose.

It is therefore an object of the present invention to provide a new and improved process for preparing a molding material from high molecular weight synthetic linear polymerization and polycondensation products, with particular reference to molding materials for use in extrusion and injection molding processes.

It is a further object of the invention to provide a new and improved process of the kind indicated which will be simple and effective in actual practice.

It is still another object of the invention to provide the art with new and improved molding materials of the kind indicated which are characterized by a relatively homogeneous disturbed spherulitic structure having unusually desirable molding properties, and especially in respect to injection molding.

The manner in which these and other objects and features of the invention are attained will appear more fully from the following description thereof, in which reference is made to typical and preferred procedures in order to indicate more fully the nature of the invention, but without intending to limit the invention thereby.

According to the present invention, it has been discovered that for the preparation of a finely divided material on the basis of crystallizable linear polymerization and polycondensation products of the kind indicated above in which the polymers show only a disturbed spherolitic structure (and hence a substantially homogeneous structure) it is not necessary that the polymers be heated at a temperature lying between the melting temperature and the critical temperature thereof, but that the same result can be obtained by heating to a higher temperature provided, however, that this heating be combined with a mechanical mixing action. Furthermore, it has been discovered that if the heating is effected at a temperature lying between the melting point and the critical temperature of the polymer the mixing action promotes the formation of a disturbed spherulitic structure in the cooled product. The size of the spherulite lumps in a disturbed spherulitic structure is seldom more than about 50µ (0.005 mm.).

The method for the preparation of a finely divided molding material on the basis of crystallizable linear polymerization and polycondensation products according to the present invention is characterized in that crystallizable linear polymerization and polycondensation products of low monomer content are heated, starting from the solid phase, to a temperature above their melting point, and subsequently subjected to such an intensive mechanical mixing action that when the polymers are later cooled only a disturbed spherulitic structure is formed, after which the polymeric material is cooled and finely divided.

Although the method according to the present invention is independent of the temperature of heating, in other words it is not restricted to the small temperature range between the melting temperature and the critical temperature of the polymer undergoing treatment, one cannot mix, however, at too high temperatures as in that case thermal degradation of the polymer may occur. Stated differently, the temperature of operation is subject to wide variation without departing from the spirit and scope of the invention, it being only necessary to operate above the melting point but below the point at which any appreciable thermal degradation of the polymer in question may occur.

For the preparation of a finely divided molding material on the basis of polyaminocaproic acid having a melting temperature of about 215° C. it is preferred, according to the present invention, to subject this polymer to a strong rubbing or shearing action at a temperature of about 280° C. After cooling and subdividing, the polyaminocaproic acid shows a homogeneous disturbed spherulitic structure and is eminently suitable for use as molding material and especially for injection molding operations.

For mixing the polymers while subjecting them to strong rubbing and shearing forces, it is preferred to use extrusion machines of the conventional worm screw type.

According to a preferred embodiment of the method according to the present invention, polyaminocaproic acid is mixed in an extrusion machine of the worm screw type for a period of at least one minute at a temperature of about 280° C., subsequently extruded in water at 20° C. in the form of a thread having a diameter of 3 mm., and then the thread is cut up into granules. Notwithstanding the fact that the polymer is heated to a temperature above its critical temperature, the granules thus obtained show a homogeneous disturbed spherulitic structure.

When such granules are thereafter heated above their critical temperature without being subjected to a strong rubbing or shearing action and the melt is thereafter slowly cooled, the solidified polymer still shows a homogeneous disturbed spherulitic structure. Manifestly, therefore, a non-reversible physical transformation has occurred in the polymer as a result of the heating above the melting point combined with the strong rubbing action. Consequently granules made in this manner are very suitable for the preparation of molded objects by means of injection molding.

At any time, and also at operating temperatures above the critical temperature of the polymer in question, objects having a homogeneous disturbed spherulitic structural appearance are obtained from the aforesaid finely divided molded material by injection molding. As a result these molded objects have more homogeneous properties and are free from internal strains.

Example I

Granules of a high molecular weight synthetic linear polyamide having a specific viscosity of 1.4, formed from the polymerization of ε-caprolactam by polymerization thereof in the presence of 0.1% by weight of phosphoric acid as a stabilizer, and containing about 2% by weight of water-soluble constituents, were supplied to an extrusion machine of the worm screw type. The length and diameter of the worm screw were 72 and 4.5 cm., respectively. The extrusion machine was kept at 280° C. The average time during which the polymer remained in the extrusion machine was 2 minutes. The formed thread from the extrusion machine having a diameter of 3 mm. was injected into water at 20° C. and cut to granules. The granules thus obtained showed a homogeneous disturbed spherulite structure.

If the time during which the polymer remained in the extrusion machine was reduced to 30 seconds and the formed thread was injected into water and cut to granules as described above, the resulting polymer granules showed a non-homogeneous distribution of chiefly spherulitic structure.

Example II

Granules of a high molecular weight synthetic linear polyamide having a specific viscosity of 1.6, formed by polycondensation of hexamethylene diamine and adipic acid, were continuously fed into an extrusion machine according to Example I. The extrusion machine was kept at 300° C. and the average time during which the polymer remained in the extrusion machine was 90 seconds. The formed thread having a diameter of 1.5 mm. was injected into water at 35° C. and cut to granules. The granules thus obtained showed a homogeneous disturbed spherulitic structure.

If the average residence time of the polymer in the extrusion machine was reduced to 30 seconds and the formed thread was injected into water and cut to granules as described above, the resulting polymer granules showed a nonhomogeneous distribution of mainly spherulitic structure.

Example III

The polymer granules of Examples I and II having homogeneous disturbed spherulitic structure were molded to shaped objects by means of the usual injection molding machine. The temperature of the injection molding machine was kept at 260° C. and 290° C., respectively. The molded objects were free from internal strains, had a homogeneous disturbed spherulitic structure, and did not show flow lines.

On the other hand, the original polymer granules of Examples I and II, which therefore had a nonhomogeneous spherulitic structure, were molded to shaped objects by injection molding in the same manner as just described. These molded objects, unlike those just described, showed a nonhomogeneous distribution of mainly spherulitic structure and were not free from internal strains.

Not only polyamides produced from caprolactam but also those which are prepared by polycondensation from various dicarboxylic acids and diamines may be advantageously employed in accordance with the present invention. Since the polyamides are well known and per se form no part of the present invention it is deemed unnecessary in the interests of brevity to do more than supplement the present disclosure by referring to typical prior art disclosures illustrative thereof merely by way of example, such as du Pont's U.S. patents to Carothers including Nos. 2,071,250–3 and 2,130,948 and the "Collected Papers of Wallace Hume Carothers on High Polymeric Substances," Interscience Publishers, Inc., New York, 1940.

The invention is further illustrated by the accompanying drawings, which are photomicrographs taken at various magnifications of polymeric materials of the kind to which the present invention applies, some showing the structure obtained when the process which is a part of the present invention is employed and others showing, for comparison purposes, the result of operating in a broadly similar fashion but without employing the process of the present invention.

Figure 2:
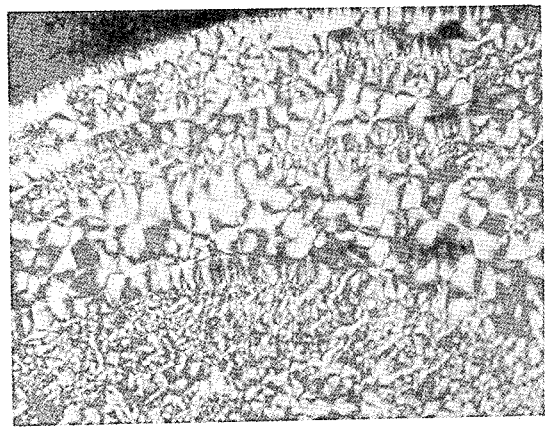
Figure 3:
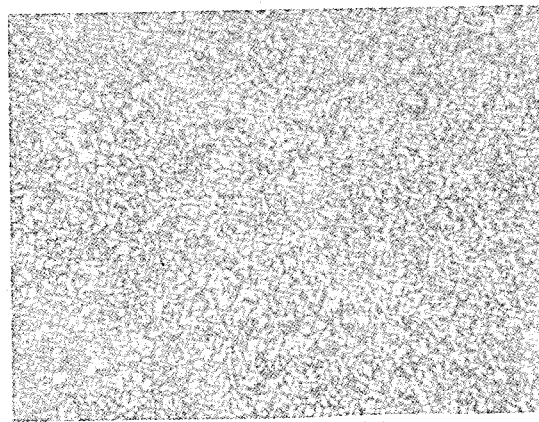

Figures 1, 2 and 3 are photomicrographs, each taken at a magnification of 120 ×, showing sections of injection molding chips or granules made from a high molecular weight synthetic linear polyamide formed by the polymerization of ε-caprolactam. Figure 1 shows a cross-section of such a chip that has been processed by heating to 260° C. followed by very slow cooling. The resulting structural picture is that characteristic of normal spherulitic, consisting of polyhedral spherulites and palisades. Figure 2 shows the the cross-section of a similar chip that has received the same treatment except that it has been stirred a little while being heated to 260° C. The resulting structural picture is that characteristic of normal spherulitic consisting of polyhedral spherulites and palisades, together with some disturbed spherulitic (granular) structure. Figure 3 shows a cross-section of a similar chip that has received the same treatment except that it has been subjected to intensive mechanical stirring or mixing involving strong rubbing or shearing forces while being heated to 260° C., thus being in accordance with the process according to the present invention. The resulting structural picture is that characteristic of disturbed spherulitic with a homogeneous granular structure throughout.

Figure 4 shows a cross-section (magnification 50 ×) of an injection molded test bar made from polycaprolactam chips having normal spherulitic structure. Figure 5 shows a cross-section (magnification 50 ×) of an otherwise identically made injection-molded test bar employing polycaprolactam chips produced in accordance with the present invention, said chips having the characteristic homogeneous disturbed spherulitic structure. Figure 6 shows a cross-section of the same structure as that of Figure 5 but at a magnification of 350 ×.

The foregoing photomicrographs were taken under the polarizing microscope with transmitted plane-polarized light. By reference to "palisades" is meant the appearance of unsymmetrical shapes as represented by spherulites whose growth may be said to be "partially stunted," such as for example spherulites which occur in rows on the boundary of the material or at abrupt structure transitions of the material. By "polyhedral spherulites" is meant those where some distortion has taken place, i.e., the spherical shape is primarily present or at least more or less dimly discernible, but has been deformed to a polyhedron due to the growth of the spherulites during which they become crowded or pressed together. The "disturbed spherulitic" structure produced in accordance with the present invention may be regarded as in the nature of a granular structure of crumbled spherulites of somewhat irregular shape distributed however rather uniformly or homogeneously throughout substantially the entire polymer mass; it may also be referred to as a "homogenized" structure in the polymer material.

It will be noted that considerable emphasis has been placed above upon the especial desirability of the present invention as applied to the production of shaped objects made by injection molding methods. As exemplifying the prior art recognition of the special difficulties of using high molecular weight synthetic linear polyamides for injection molding with the usual apparatus, reference may be made to W. Hechelhammer's article in "Kunststoffe," 45, 414–417 (1955), especially at page 417.

While specific examples of preferred methods embodying the present invention have been set forth above, it will be understood that many changes and modifications may be made in the methods of procedure without departing from the spirit of the invention. It will therefore be understood that the examples cited and the particular methods of operation set forth above are intended to be illustrative only, and are not intended to limit the scope of the invention.

What is claimed is:

1. A method for the preparation of shaped articles comprising the steps of heating crystallizable synthetic linear polyamides of relatively low monomer content from the solid phase to above their melting point but below the point of incipient thermal degradation thereof, subjecting the heated polymeric material to intensive mechanical working including rubbing and shearing forces sufficiently great such that upon cooling the polymeric material only a disturbed spherulitic structure is formed, cooling the polymeric material, finely dividing the same, remelting the polymeric material, shaping said remelted material, and cooling said shaped material whereby a body is obtained having a homogeneous disturbed spherulitic structure.

2. A method according to claim 1, wherein the monomer content of the initial polymeric material is not more than about 2% by weight.

3. A method according to claim 1, wherein the initial polymeric material is polyaminocaproic acid which is heated to a temperature of about 280° C.

4. A method according to claim 1, wherein polyaminocaproic acid is mechanically worked in an extrusion machine of the worm screw type for a period of at least 1 minute at a temperature of about 280° C., the mechanically worked polymeric material is subsequently injected into water at about 20° C. in the form of a thread having a diameter of about 3 mm., and the thread is then cut to granules, before remelting.

5. The method according to claim 1 wherein said remelted material is shaped by injection molding.

6. A method for the preparation of shaped articles from a high molecular weight synthetic linear polyamide consisting essentially of polycaprolactam, comprising the steps of heating polycaprolactam having a monomer content of not more than about 2% by weight to a temperature above its melting point but below that at which any appreciable thermal degradation of the polymeric material would occur, subjecting the heated polycaprolactam to intensive mechanical working including rubbing and shearing forces sufficiently great so that upon cooling the polycaprolactam only a disturbed spherulitic structure is formed therein, cooling the thus heated and mechanically worked polycaprolactam, finely dividing the same, remelting the finely divided polycaprolactam, shaping said remelted polycaprolactam, and cooling said shaped polycaprolactam whereby a body is obtained having a homogeneous disturbed spherulitic structure.

7. A method according to claim 6, wherein the polycaprolactam is heated to temperatures of the order of about 260° C. to 300° C. while being mechanically worked.

8. A method according to claim 6, wherein the polycaprolactam is mechanically worked in an extrusion machine of the worm screw type for a period of at least 1 minute, the mechanically worked polycaprolactam is then injected in the form of a thread into water at about room temperature, and the thread is then cut into chips or granules.

9. A method according to claim 6 wherein said remelted polycaprolactam is shaped by injection molding.

References Cited in the file of this patent

UNITED STATES PATENTS

| | | |
|---|---|---|
| 2,212,772 | Graves | Aug. 27, 1940 |
| 2,309,729 | Gordon | Feb. 2, 1943 |
| 2,370,721 | Dreyfus | Mar. 6, 1945 |
| 2,436,201 | Cole | Feb. 17, 1948 |
| 2,473,924 | Walker | June 21, 1949 |
| 2,530,362 | Morris | Nov. 14, 1950 |
| 2,585,156 | Montross | Feb. 12, 1952 |

UNITED STATES PATENT OFFICE
CERTIFICATE OF CORRECTION

Patent No. 2,976,572                March 28, 1961

Jacob Christoffel Ferdinand Kessler

It is hereby certified that error appears in the above numbered patent requiring correction and that the said Letters Patent should read as corrected below.

Column 2, line 33, for "(0.005 mm.) read -- (0.05 mm.) --; column 4, line 44, strike out "the", second occurrence.

Signed and sealed this 12th day of September 1961.

(SEAL)
Attest:

ERNEST W. SWIDER                DAVID L. LADD
Attesting Officer                 Commissioner of Patents

USCOMM-DC